R. KANIA.
COOKER.
APPLICATION FILED JULY 23, 1921.

1,418,378.

Patented June 6, 1922.
2 SHEETS—SHEET 1.

Inventor
R. Kania,
By C.A.Snow & Co.
Attorney

R. KANIA.
COOKER.
APPLICATION FILED JULY 23, 1921.
1,418,378.
Patented June 6, 1922.
2 SHEETS—SHEET 2.
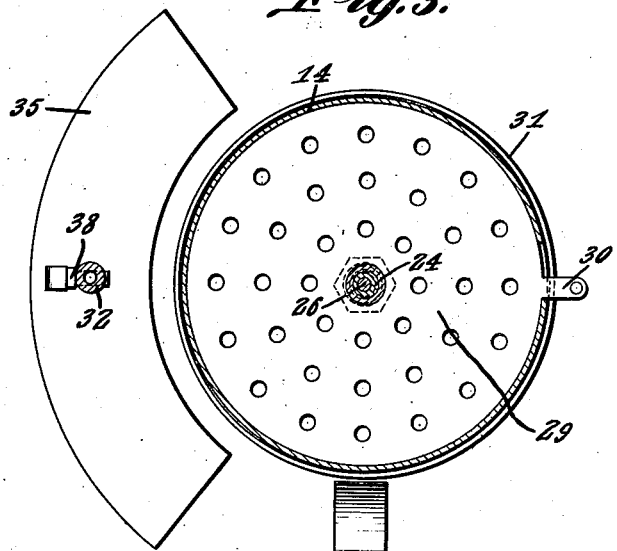
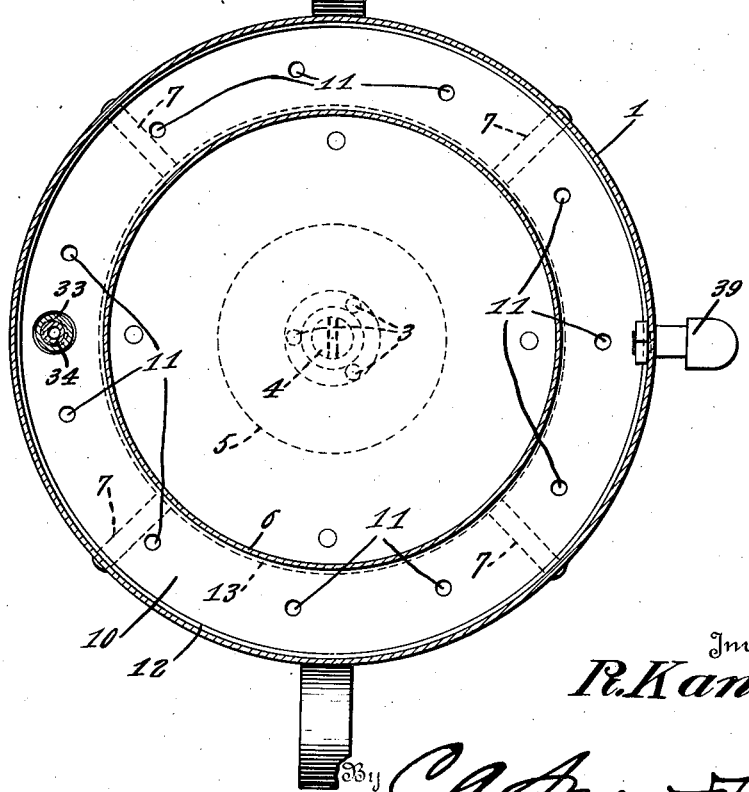

UNITED STATES PATENT OFFICE.

RUDOLF KANIA, OF VINDEX, MARYLAND.

COOKER.

1,418,378.  Specification of Letters Patent.  Patented June 6, 1922.

Application filed July 23, 1921. Serial No. 487,061.

*To all whom it may concern:*

Be it known that I, RUDOLF KANIA, a citizen of the United States, residing at Vindex, in the county of Garrett and State of Maryland, have invented a new and useful Cooker, of which the following is a specification.

This invention relates to domestic cooking vessels, and more particularly to a combination steamer, boiler and roaster.

The primary object of the invention is to provide a vessel of this character having novel means for controlling the overflow from the material undergoing the process of cooking, to eliminate any possibility of the overflow passing to the stove.

A further but important object of the invention is to provide means for closing the upper portion of the vessel when rapid cooking is necessary, thereby utilizing the steam to intensify the heat within the cooking receptacle.

A further object of the invention is to provide means for returning the overflow to the interior of the vessel, the means referred to being controlled at the will of the operator.

Another object of the invention is the provision of means to replenish the supply of water held between the main receptacle and the inner or cooking receptacle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a sectional view taken on line 3—3 of Figure 1.

Figure 4 is a sectional view taken on line 4—4 of Figure 1.

Figure 1:
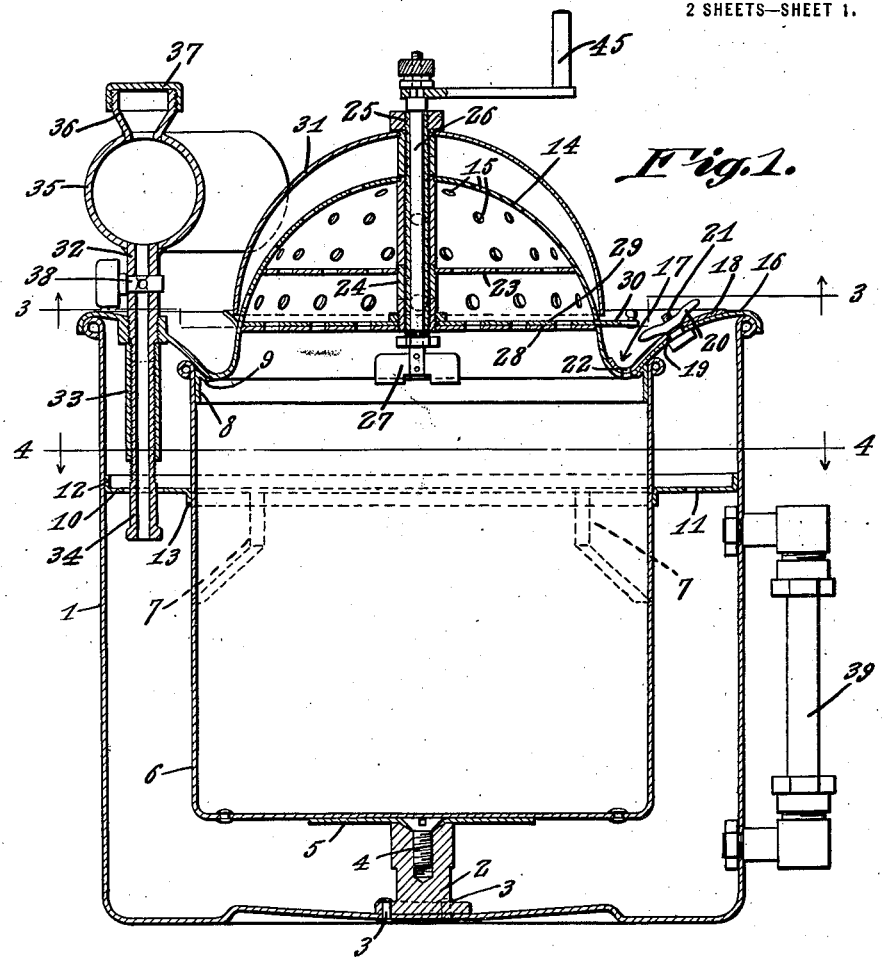
Figure 1 is a vertical sectional view through a cooking vessel constructed in accordance with the present invention.
Figure 2:
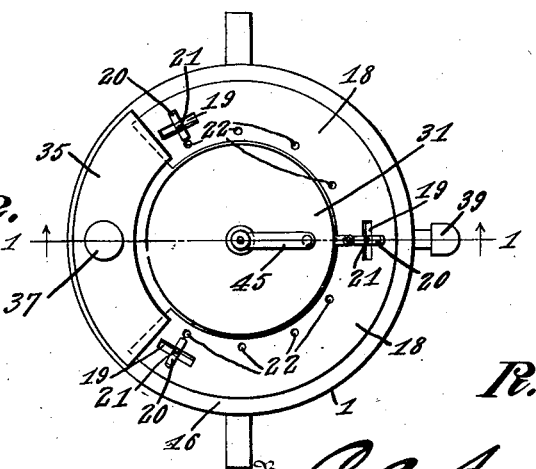
Figure 2 is a top plan view of the same.

Referring to the drawings in detail, the reference character 1 designates the outer or main receptacle of the cooking vessel which is provided with a support 2, which is secured to the base of the receptacle 1, as by means of the rivets 3, the support 2 being provided with a threaded opening to accommodate the screw 4 that secures the supporting disk 5 to the support 2.

Positioned within the main receptacle 1 is an inner cooking receptacle indicated at 6, which receptacle is of a diameter less than the diameter of the main receptacle 1 so that a space will be provided between these receptacles 1 and 6 to accommodate water, whereby the inner cooking receptacle 6 which contains the articles undergoing the cooking process, are held out of contact with the direct heat of the fire. In order that the inner cooking receptacle 6 will be held in proper spaced relation with the inner wall of the main receptacle 1, spacing blocks 7 are provided, which blocks are secured to the wall of the receptacle 1 and extend inwardly to contact with the outer surface of the inner cooking receptacle 6.

As shown, the inner cooking receptacle 6 rests on the supporting disk 5 and has its upper extremity disposed in a plane below the upper edge of the main receptacle 1, where the same is reinforced by an inner ring 8 which has a depending flange portion 9 adapted to support the cover to be hereinafter more fully described.

Positioned on the spacing blocks 7, is a spacing ring 10 which is provided with a plurality of openings 11 to permit the steam generated between the receptacles 1 and 6 to pass upwardly. This ring 10 is provided with flanges 12 and 13 respectively, the flange 12 contacting with the main receptacle 1, while the flange 13 contacts with the inner cooking receptacle 6 in a manner to support the ring 10 in proper relation within the space.

The cover, which forms an important feature of the present invention, includes a central dome-shaped portion 14 which is provided with a plurality of openings 15 to provide communication between the interior of the cooking receptacle and the atmosphere, permitting the steam generated within the inner receptacle, to pass outwardly, or allow the overflow from articles cooking within the inner receptacle to pass outwardly and downwardly. Forming the lower portion of the cover 14 is a circumferential flange 16 which is depressed to provide a trough 17 which is provided with openings at the base thereof to permit the overflow to be returned to the interior of the inner cooking receptacle 6.

Operating on the flange 16, is a slide 18 which has elongated openings 19 formed therein and adapted to accommodate the winged securing nut 20 which is positioned on the screw 21 associated therewith, and which is secured to the flange 16. Thus it will be seen that by moving the winged nuts 20 to register with the openings 19, the slide 18 may be removed from the flange 16. This slide is also provided with openings indicated at 22 which may be moved into registry with the drain openings of the flange 16 to permit the overflow caught by the trough 17 to pass into the inner cooking receptacle, but when the slide 18 is moved to bring the openings 22 and drain openings of the flange 16 out of registry, communication between the interior of the cooking receptacle 6 and atmosphere is cut off to exclude the overflow, which may be objectionable if returned to the inner receptacle.

Supported within the dome-shaped cover 14 is a perforated disk 23 which is mounted on the tube 24 that extends through the cover 14 and has its lower extremity disposed in a plane adjacent to the lower edge of the cover, there being provided a threaded member 25 positioned within the tube 24, which provides a bearing for the shaft 26 that extends therethrough; the lower end of the shaft being provided with a key 27 to prevent the rod 26 from being pulled through the tube 24.

At the lower end of the tube 24 are suitable threads to accommodate the perforated disk 28, which provides a support for the perforated disk 29, there being provided an operating handle 30 formed on the disk 29, to permit the disk 29 to be moved to bring the openings of the disks 28 and 29 into or out of registry at the will of the operator. A guard member 31 is supported in spaced relation with the dome-shaped cover 14, the guard member 31 being curved to conform to the curvature of the dome-shaped cover 14, the lower ends of the guard member 31 being supported in spaced relation with the cover 14 to permit the passage of steam from the inner receptacle.

Mounted within a threaded opening formed in the flange 16, is a pipe 32 which is threaded to accommodate the tube 33 which is also provided with internal threads to cooperate with the threads of the pipe 34 which feeds water to the space between the receptacles 1 and 6, it being obvious that due to the construction as described, the pipe 34 may be adjusted to position the lower extremity thereof at various levels within the space between the receptacles 1 and 6 to cause fluid to be supplied to the space.

Communicating with the space between the receptacles 1 and 6, is a supply tank 35 which has a funnel 36 formed thereon, through which fluid may be poured into the tank 35, there being a suitable cover indicated at 37 provided for closing the funnel 36. A valve member 38 is disposed within the pipe 32 to control the passage of fluid between the tank 35 and space between the receptacles 1 and 6. In order that the water levels within the space between the receptacles 1 and 6 may be determined at a glance, a water gauge indicated at 39 is provided.

Having thus described the invention, what is claimed as new is:—

1. In a device of the character described, a main receptacle and an inner cooking receptacle, spacing blocks for supporting the inner cooking receptacle in spaced relation with the main receptacle, a cover having a flange, said cover adapted to close the receptacles, a tank supported above the flange, a pipe for providing communication between the tank and space between the receptacles, and adjustable means for regulating the discharge of fluid from the tank.

2. In a device of the character described, a main receptacle, an inner cooking receptacle supported in the main receptacle, a cover for closing the receptacles, said cover including a circumferential flange having depressed portions to provide a trough, said trough having openings to permit material to be returned to the inner cooking receptacle, and means for controlling the passage of material through the openings.

3. In a device of the character described, a main receptacle, an inner cooking receptacle, a cover for closing the receptacles, said cover having means to permit steam to pass therefrom, a flange forming a part of the cover and having openings to return material to the inner cooking receptacle, a ring member having openings adapted to register with the first mentioned openings, and means to permit the ring member to be removed from the flange.

4. In a device of the character described, a main receptacle, an inner receptacle within the main receptacle, a dome-shaped cover having a flange adapted to close the receptacles, a stationary disk supported adjacent to the lower portion of the dome, a movable disk operating in conjunction therewith, said disks having openings to permit the passage of fluid therethrough, means for controlling the movements of one of the disks, and a curved guarding member disposed in spaced relation with the cover.

5. In a device of the character described, a main receptacle and an inner cooking receptacle, spacing blocks for supporting the inner cooking receptacle in spaced relation with the inner wall of the main receptacle, a spacing ring positioned on the spacing blocks and having flanges contacting with the adjacent walls of the receptacles, and a cover for covering the receptacles.

In testimony that I claim the foregoing as my own, I have hereto affixed my signature in the presence of two witnesses.

RUDOLF KANIA.

Witnesses:
R. F. NELSON,
VERBA A. WALKER.